(12) United States Patent
Ciesielczyk (10) Patent No.: US 12,435,770 B2
(45) Date of Patent: Oct. 7, 2025

(54) VIBRATION DAMPER

(71) Applicant: PREFORMED LINE PRODUCTS CO., Mayfield Village, OH (US)

(72) Inventor: Benjamin Franklin Ciesielczyk, Madison, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 352 days.

(21) Appl. No.: 18/092,693

(22) Filed: Jan. 3, 2023

(65) Prior Publication Data

US 2024/0218912 A1    Jul. 4, 2024

(51) Int. Cl.
*F16F 7/116*      (2006.01)
*F16F 7/108*      (2006.01)
*H02G 7/14*      (2006.01)

(52) U.S. Cl.
CPC .......... *F16F 7/108* (2013.01); *F16F 2222/08* (2013.01); *F16F 2230/0005* (2013.01)

(58) Field of Classification Search
CPC .. F16F 7/104; F16F 7/108; F16F 7/113; F16F 2222/08; F16F 2230/0005; H02G 7/14
See application file for complete search history.

(56) References Cited

U.S. PATENT DOCUMENTS

| | | | | |
|---|---|---|---|---|
| 2,058,173 A * | 10/1936 | Monroe | .................. | H02G 7/14 174/42 |
| 2,688,047 A * | 8/1954 | MacIntyre | ............... | H02G 7/14 174/42 |
| 3,073,887 A * | 1/1963 | McGavern | ............... | F16F 7/108 174/42 |
| 3,400,209 A * | 9/1968 | Minyu | ..................... | H02G 7/14 174/42 |
| 3,584,133 A * | 6/1971 | Claren | ..................... | H02G 7/14 174/42 |
| 4,011,397 A * | 3/1977 | Bouche | .................... | H02G 7/14 267/167 |
| 4,159,393 A * | 6/1979 | Dulhunty | ................. | F16F 7/116 174/42 |
| 4,167,646 A * | 9/1979 | Mathieu | .................. | H02G 7/14 174/42 |
| 4,527,009 A * | 7/1985 | Hawkins | ................. | H02G 7/14 174/42 |
| 4,620,060 A * | 10/1986 | Perinetti | .................. | H02G 7/14 174/42 |
| 6,397,988 B1 * | 6/2002 | Ptak | ........................ | F16F 1/505 188/380 |
| 6,469,246 B1 | 10/2002 | Van Dyke et al. | | |
| 6,774,303 B1 * | 8/2004 | Brittain | .................... | H02G 7/14 174/40 R |
| 6,943,290 B2 * | 9/2005 | Dulhunty | ................. | H02G 7/14 174/42 |

(Continued)

*Primary Examiner* — Thomas W Irvin
(74) *Attorney, Agent, or Firm* — Cooper Legal Group, LLC (57) ABSTRACT

A vibration damper for damping a vibration of a cable includes an attachment portion configured to be attached to the cable. The vibration damper includes a first flexible leg portion attached to the attachment portion and a second flexible leg portion attached to the attachment portion. The vibration damper also includes a weighted portion attached to the first flexible leg portion and the second flexible leg portion. The weighted portion is spaced a distance from the attachment portion.

20 Claims, 10 Drawing Sheets

(56) References Cited

U.S. PATENT DOCUMENTS

| | | | | |
|---|---|---|---|---|
| 6,943,291 B2* | 9/2005 | Brittain | ............ | H02G 7/14 174/40 R |
| 7,569,769 B2* | 8/2009 | Zaleski | ............ | H02G 7/14 174/41 |
| 7,819,066 B2* | 10/2010 | Smith | ............ | A63G 21/22 104/53 |
| 8,309,846 B2* | 11/2012 | Espindola | ............ | H02G 7/14 174/40 R |
| 8,336,463 B2* | 12/2012 | Smith | ............ | A63G 21/22 104/53 |
| 9,800,039 B2* | 10/2017 | Quesnel | ............ | H02G 7/14 |
| 9,948,081 B1* | 4/2018 | Barry | ............ | H02G 7/14 |
| 10,193,319 B2* | 1/2019 | Barry | ............ | H02G 7/053 |
| 10,374,405 B2* | 8/2019 | Murr | ............ | H02G 7/12 |
| 10,680,424 B2* | 6/2020 | Aida | ............ | F16F 7/10 |
| 10,965,112 B2* | 3/2021 | Crawford | ............ | F16F 7/10 |
| 11,248,676 B2* | 2/2022 | Cloud | ............ | F16F 7/104 |
| 11,353,081 B2* | 6/2022 | Kranz | ............ | F16F 7/116 |
| 11,721,964 B2* | 8/2023 | Crawford | ............ | H02G 3/0456 174/42 |
| 2004/0035601 A1* | 2/2004 | Dulhunty | ............ | H02G 7/14 174/40 CC |
| 2004/0149474 A1* | 8/2004 | Brittain | ............ | H02G 7/14 174/42 |
| 2004/0194990 A1* | 10/2004 | Brittain | ............ | H02G 7/14 174/40 CC |
| 2008/0236856 A1* | 10/2008 | Zaleski | ............ | H02G 7/14 174/42 |
| 2009/0223406 A1* | 9/2009 | Smith | ............ | A63G 21/22 104/112 |
| 2011/0024152 A1* | 2/2011 | Espindola | ............ | H02G 7/14 174/42 |
| 2012/0031296 A1* | 2/2012 | Smith | ............ | B61H 9/02 104/113 |
| 2013/0061466 A1* | 3/2013 | Casenhiser | ............ | H02G 1/02 174/42 |
| 2016/0079745 A1* | 3/2016 | Quesnel | ............ | H02G 7/14 174/42 |
| 2016/0344174 A1* | 11/2016 | Murr | ............ | H02G 7/12 |
| 2018/0316172 A1* | 11/2018 | Barry | ............ | H02G 7/053 |
| 2018/0366932 A1* | 12/2018 | Aida | ............ | F16F 7/10 |
| 2019/0229512 A1* | 7/2019 | Crawford | ............ | F16F 7/10 |
| 2019/0376575 A1 | 12/2019 | Cloud et al. | | |
| 2021/0102594 A1* | 4/2021 | Kranz | ............ | F16F 7/116 |
| 2021/0210942 A1* | 7/2021 | Crawford | ............ | F16F 7/116 |
| 2023/0283058 A1* | 9/2023 | Etzler | ............ | F16F 7/104 174/42 |
| 2024/0392856 A1* | 11/2024 | Mao | ............ | F16F 7/10 |

* cited by examiner

VIBRATION DAMPER

TECHNICAL FIELD

The instant application is generally directed towards a vibration damper. For example, the instant application is directed towards a vibration damper for reducing a vibration in a cable.

BACKGROUND

Vibration dampers may be used for reducing vibrations of a cable. Vibration dampers may be attached to a cable.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a vibration damper for damping a vibration of a cable includes an attachment portion configured to be attached to the cable. The vibration damper includes a first flexible leg portion attached to the attachment portion and a second flexible leg portion attached to the attachment portion. The vibration damper also includes a weighted portion attached to the first flexible leg portion and the second flexible leg portion. The weighted portion is spaced a distance from the attachment portion.

According to an aspect, a vibration damper for damping a vibration of a cable includes an attachment portion configured to be attached to the cable. The attachment portion has a first attachment side and a second attachment side. The vibration damper also includes a first flexible leg portion attached to the attachment portion. The first flexible leg portion extends away from the first attachment side and extends away from the second attachment side. The vibration damper further includes a second flexible leg portion attached to the attachment portion. The second flexible leg portion extends away from the first attachment side and extends away from the second attachment side. The vibration damper still further includes a first weighted portion attached to the first flexible leg portion and the second flexible leg portion. The first weighted portion is spaced a first separation distance from the first attachment side. The vibration damper also includes a second weighted portion attached to the first flexible leg portion and the second flexible leg portion. The second weighted portion is spaced a second separation distance from the second attachment side.

According to an aspect, a method of damping a vibration of a cable includes attaching a vibration damper to the cable. The vibration damper includes an attachment portion configured to be attached to the cable. The vibration damper also includes a first flexible leg portion attached to the attachment portion and extending along a first leg axis. The vibration damper further includes a second flexible leg portion attached to the attachment portion and extending along a second leg axis. The vibration damper still further includes a weighted portion attached to the first flexible leg portion and the second flexible leg portion. The method also includes damping the vibration of the cable through first movement of the weighted portion in a first direction that is perpendicular to at least one of the first leg axis or the second leg axis and the first direction is at least one of toward the cable or away from the cable.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Figure 1:
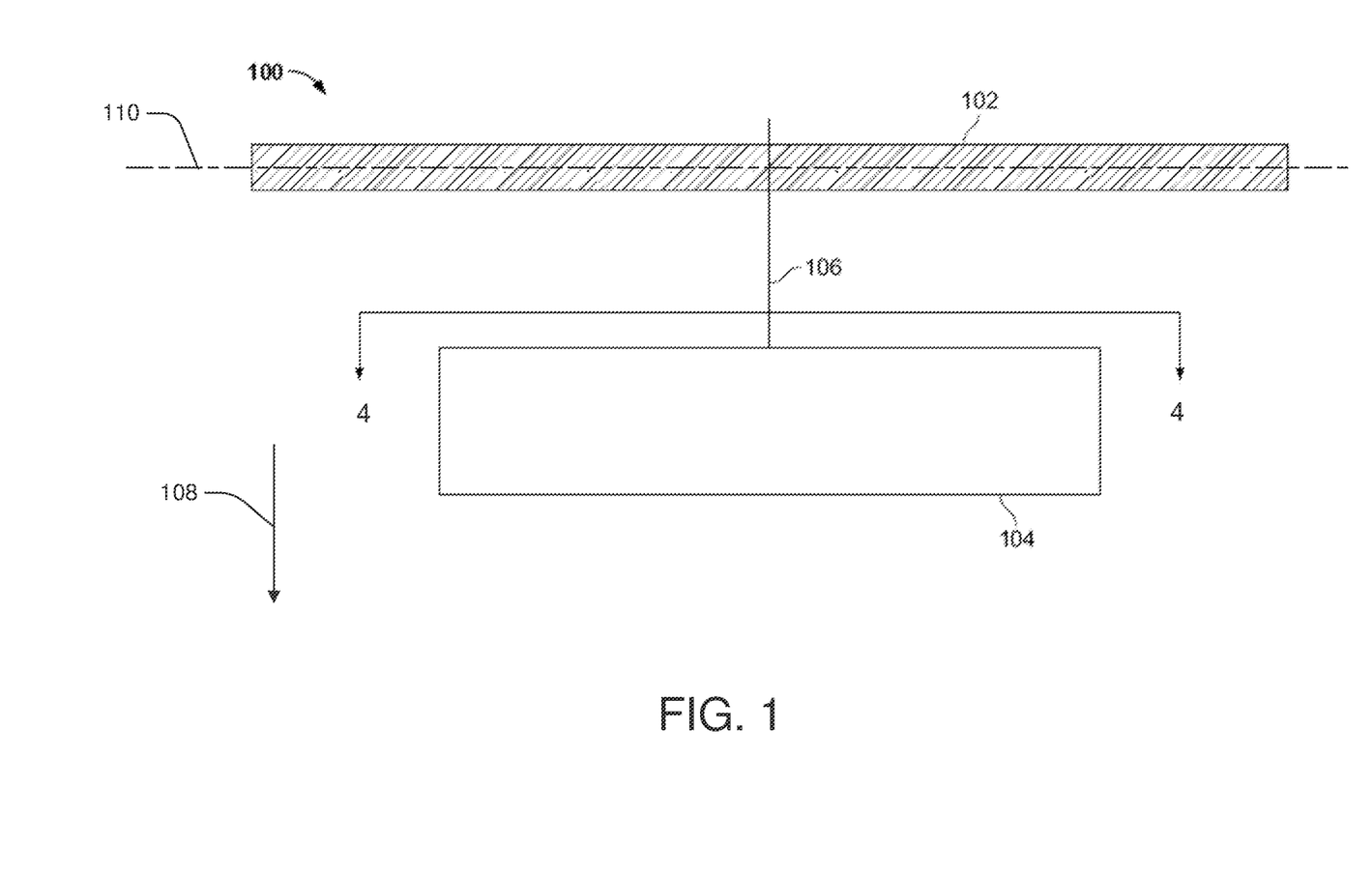
FIG. 1 illustrates an example vibration damper system.

Referring to FIG. 1, an example damper system 100 is illustrated in a schematic elevation view. In some examples, the damper system 100 comprises a cable 102 that may be an electrically conductive or non-conductive wire, cable, line, rope, fiber, fiber optic, T2 conductor, etc. The cable 102 may include any number of materials including metal materials (e.g., conductors), non-metal materials (plastics, composite materials, etc.), or the like, that may or may not be implemented to provide utility services and/or products. The cable 102 can support one or more structures, such as robots, vibration dampers, etc. In some examples, a goal of the damper system 100 may be to reduce and/or attenuate (e.g., damping) unwanted vibrations of the cable 102. The cable 102 may vibrate due to environmental effects such as wind, precipitation, etc., or from objects/animals contacting the cable 102. It is often the case that the described vibration of the cable 102 can damage the cable 102 and the associated components used to suspend the cable 102. As such, it can be beneficial to reduce or eliminate the vibration of the cable 102.

The damper system 100 comprises a vibration damper 104. In an example, the vibration damper 104 can be attached to (e.g., suspended from) the cable 102 by an attachment structure 106. The attachment structure 106 may include a hook, clamping mechanism, or other types of mechanical fasteners that function to attach the vibration damper 104 to the cable 102. In this way, the vibration damper 104 may be secured to the cable 102 and limited from being inadvertently detached and/or separated from the cable 102. As will be described herein, the vibration damper 104 can reduce and/or attenuate vibrations that are experienced by the cable 102. In more common examples, the vibration damper 104 is hanging beneath the cable 102 such that gravity is acting in a downward direction 108 in FIG. 1. In some examples, the cable 102 is extends along a cable axis 110. It is also to be understood that the cable 102 and the cable axis 110 need not be horizontal as shown, but can also have curvilinear shapes such as an arc, a sinusoidal wave pattern, etc. In some examples, the vibration damper 104 can be secured to the cable 102 at or near a local minimum elevation point between two or more supporting structures such as poles, towers, etc.

Figure 2:
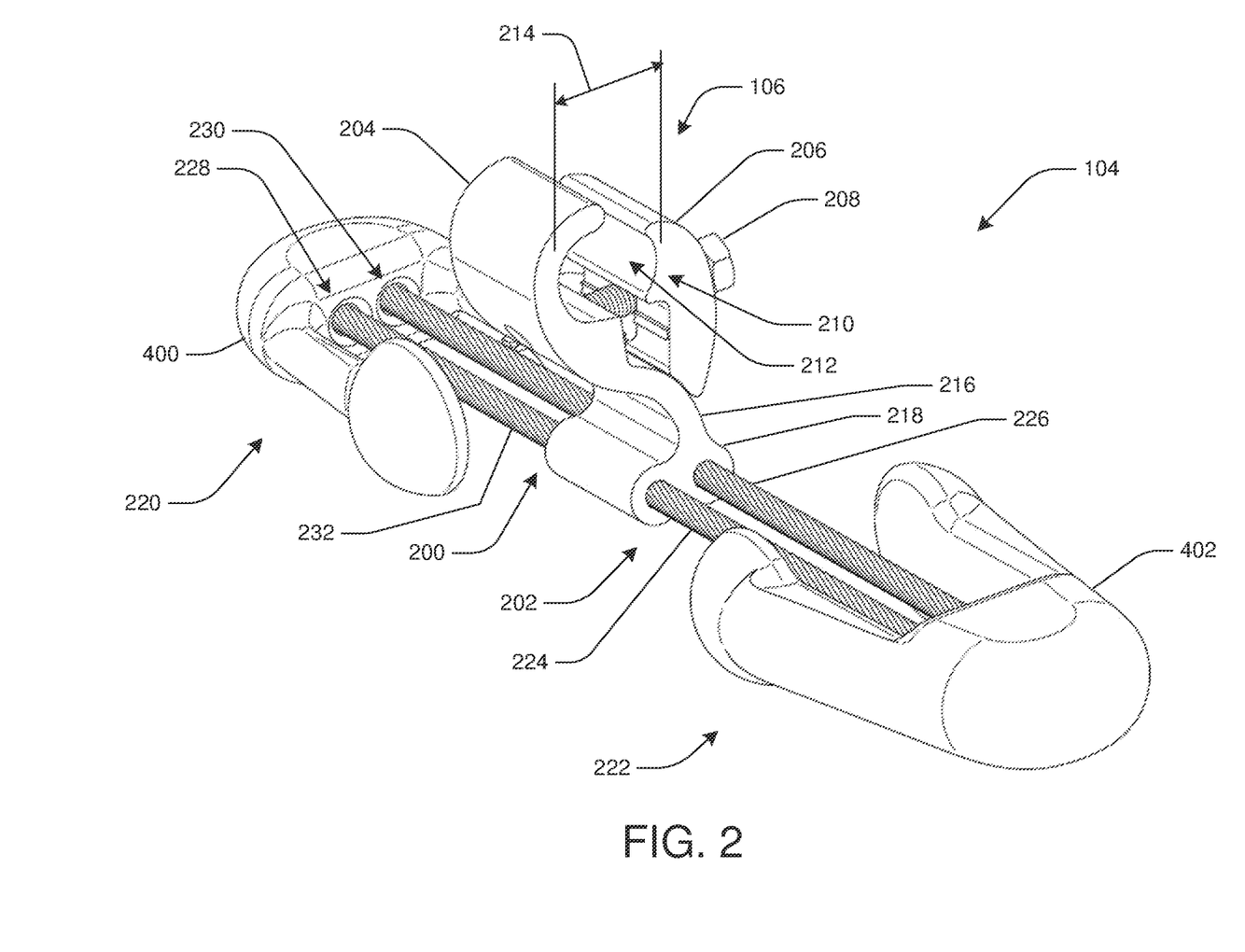
FIG. 2 illustrates an example vibration damper.

Referring to FIG. 2, a perspective view of the vibration damper 104 is illustrated. In some examples, the attachment structure 106 may be located towards a center of the vibration damper 104, and may define a first attachment side 200 and a second attachment side 202. The attachment structure 106 can include a fixed clamp arm 204 and an adjustable clamp arm 206. The fixed clamp arm 204 and the adjustable clamp arm 206 can be attached to one another with an attachment device 208 such as a threaded fastener as shown in FIG. 2. However, this is not meant to be limiting, and any suitable attachment device can be used with the presently disclosed devices and methods. The attachment device 208 is used to create relative movement between the fixed clamp arm 204 and the adjustable clamp arm 206 such that the attachment structure 106 can be attached to the cable 102 (not shown in FIG. 2) to support the vibration damper 104.

As shown in FIG. 2, some examples of attachment structure 106 can define an opening 210 configured to cooperate with a portion of the cable 102. At least one of the fixed clamp arm 204 or the adjustable clamp arm 206 include a curved surface 212 configured to cooperate with an exterior surface (e.g., an outside diameter) of the cable 102. As the attachment structure 106 is secured to the cable 102, an operator can adjust the attachment device 208 such that a distance 214 across the opening 210 is reduced to approximate a diameter of the cable 102. As such, an operator can manipulate the attachment device 208 such that the attachment structure 106 attaches or secures the vibration damper 104 to the cable 102 for a suitable range of applications and environments.

The attachment structure 106 can include an intermediate portion 216 extending between the fixed clamp arm 204 or the adjustable clamp arm 206 at an upper end and an attachment portion 218 at a lower end. It is to be appreciated that the geometry of the attachment structure 106, the intermediate portion 216, and the attachment portion 218 can be designed and constructed so as to create particular relationships between the cable 102 and the structures of the vibration damper 104. For example, the geometric relationships may locate a center of gravity of the vibration damper 104 at a position directly below an axis of the cable 102. Other geometric relationships are contemplated within this disclosure in order to improve damping characteristics of the vibration damper 104 and/or tune the vibration characteristics of the cable 102. In this way, the attachment structure 106 is attached to the attachment portion 218 that is configured to attach the attachment portion 218 to the cable 102.

A first portion 220 of the vibration damper 104 may be disposed on the first attachment side 200 of the attachment structure 106, while a second portion 222 of the vibration damper 104 may be disposed on the second attachment side 202 of the attachment structure 106.

A first flexible leg portion 224 is attached to the attachment portion 218 and a second flexible leg portion 226 is attached to the attachment portion 218. Any suitable attachment structure or method of attachment can be used in conjunction with the present disclosure. In some examples, the attachment portion 218 is crimped around the first flexible leg portion 224 and the second flexible leg portion 226 to attach the first flexible leg portion 224 and the second flexible leg portion 226 to the attachment portion 218. In some examples, the first flexible leg portion 224 and the second flexible leg portion 226 can extend through the attachment portion 218 such that the first flexible leg portion 224 and the second flexible leg portion 226 are each continuous from the first attachment side 200 to the second attachment side 202.

The first flexible leg portion 224 and the second flexible leg portion 226 can be constructed in any suitable manner with various materials. The flexible leg portions 224, 226 can comprise any number of materials, such as a braided wire, cable, or the like. In some examples, the flexible leg portions 224, 226 may have at least some degree of flexibility and/or springiness, such that the flexible leg portions 224, 226 can bend, flex, and/or otherwise move in response to vibration forces. In the shown examples, the flexible leg portions 224, 226 consist of individual strands 232 that can be cabled or helically wound together. In some examples, the strands 232 comprise a relatively rigid material that provides at least some degree of rigidity, inflexibility, strength, support, etc. In some examples, the strands 232 can include a metal material.

In some examples, the first flexible leg portion 224 and the second flexible leg portion 226 can be known as messengers or messenger wires. The first flexible leg portion 224 and the second flexible leg portion 226 can include two or more layers of helically wound strands 232 of high tensile steel wire. In some examples, the first flexible leg portion 224 and the second flexible leg portion 226 can be made of formed hard steel wires that are galvanized for corrosion resistance. However, the first flexible leg portion 224 and the second flexible leg portion 226 can also be coated with a mischmetal coating or a bezinal coating as opposed to galvanization. It is to be understood that any suitable material is contemplated for the purposes of this disclosure.

Figure 3:
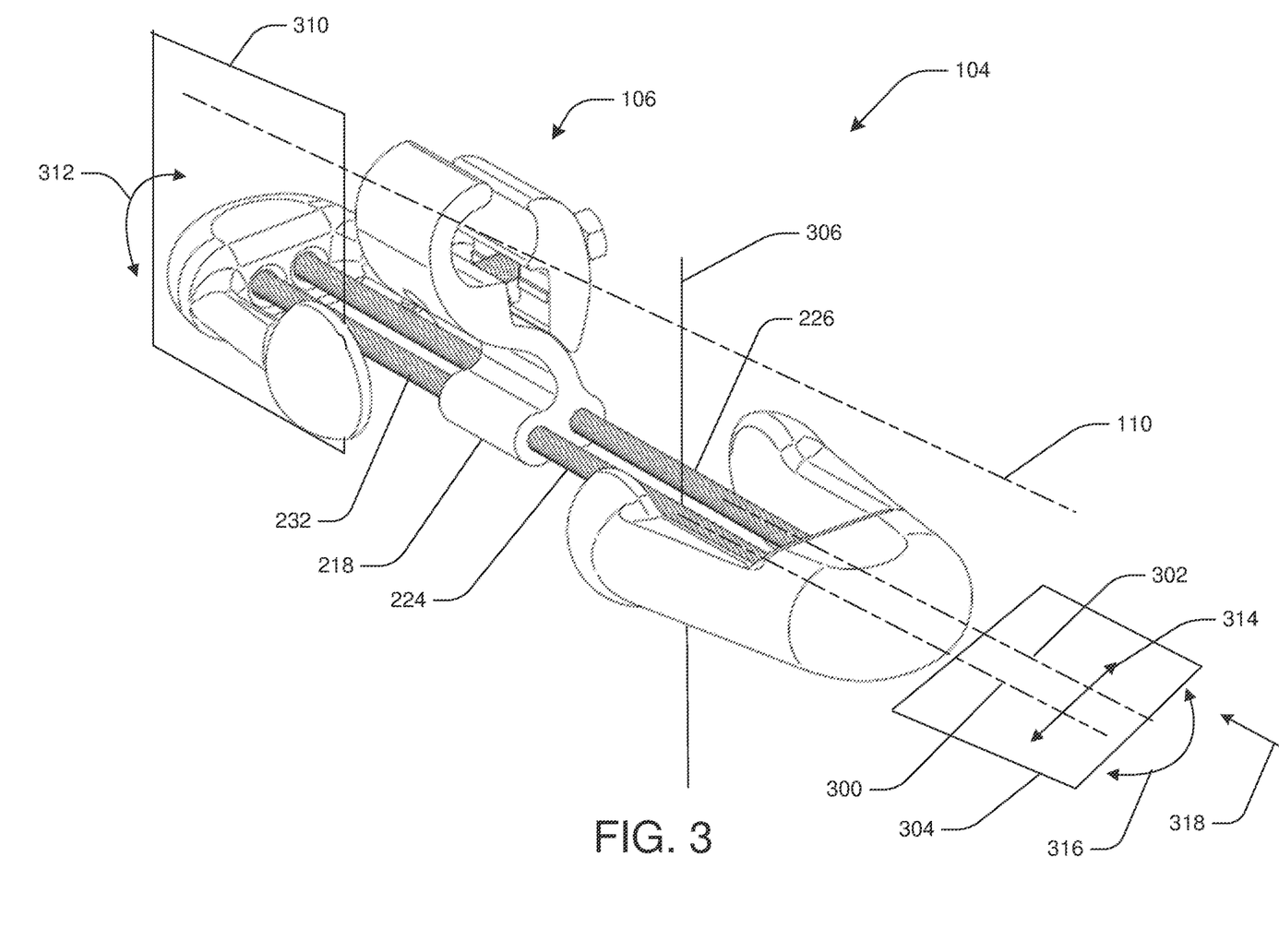
FIG. 3 is similar to FIG. 2 but illustrating lines, planes, etc.

Referring to FIG. 3, a perspective view of the vibration damper 104 similar to FIG. 2 is illustrated. In some examples, the first flexible leg portion 224 extends along a first leg axis 300, and the second flexible leg portion 226 extends along a second leg axis 302. In some examples, the first leg axis 300 is parallel to the second leg axis 302. In some examples, the first leg axis 300 and the second leg axis 302 lie within a plane 304, and the plane 304 is perpendicular to a line 306 passing through the cable 102 (represented in FIG. 3 by cable axis 110) and between the first flexible leg portion 224 and the second flexible leg portion 226. In some examples, the line 306 is oriented vertically with respect to a horizontal ground surface (not shown), although it is to be appreciated that many cables 102 are suspended above surfaces that are angled with respect to horizontal surfaces or the ground surface may be undulating or otherwise rough.

In other examples, the first leg axis 300 and the second leg axis 302 lie within a first plane (e.g., the plane 304). The plane 304 can be perpendicular to a second plane 310 passing through the cable axis 110 (shown in FIG. 3 without the cable 102 for clarity) and between the first flexible leg portion 224 and the second flexible leg portion 226. In some examples, the first plane 304 is oriented horizontally with respect to a horizontal ground surface (e.g., parallel to a horizontal ground surface). As such, the second plane 310 can be oriented vertically with respect to a horizontal ground surface or any other horizontal plane of reference. Motion or flexing of the first flexible leg portion 224 and the second flexible leg portion 226 in a direction parallel to the second plane 310 or within a few degrees of the second plane 310 can be represented by the line 312 having arrows indicating rotation. In some examples, "within a few degrees" can mean within 5 degrees. In further examples, "within a few degrees" can mean within 2.5 degrees.

Rotation is caused by movement of a portion of the first flexible leg portion 224 and the second flexible leg portion 226 while the first flexible leg portion 224 and the second flexible leg portion 226 are restrained at the attachment portion 218. The line 312 can represent the direction of vertical motion or rotation of the first flexible leg portion 224 and the second flexible leg portion 226 which can be said to be a first movement in a first direction 312.

Some known vibration dampers for wires include a single flexible leg that can be negatively affected by motion or vibration modes that can be described by side-to-side or circular motions. The side-to-side vibration or motion is represented by the line labeled by reference character 314. The side-to-side motion 314 can lie within the plane 304 or be within about a few degrees of lying within the plane 304 and having a directional component that lies within the plane 304. In some examples, "within a few degrees" can mean within 5 degrees. In further examples, "within a few degrees" can mean within 2.5 degrees. The circular motions can be described by relative motion revolving around any line that is parallel or nearly parallel to either the first leg axis 300 or the second leg axis 302. The side-to-side vibration or motion 314 can result in a rotational movement represented by arrow 316 due to the fact that the first flexible leg portion 224 and the second flexible leg portion 226 are rigidly attached to the attachment portion 218 of the attachment structure 106.

Known single-leg versions of vibration dampers can be similar to the first flexible leg portion 224 and the second flexible leg portion 226 of the present disclosure in that the single leg can be include wound or cabled strands forming a wire or cable. When exposed to side-to-side or circular vibration motions, the strands forming the single leg can wrap and unwrap the windings of the single leg. This gives rise to relative movement between the strands of the single leg and develop friction forces between the strands. Friction forces can beneficially help attenuate vibration, however, the friction can also lead to undue wear and a shortened life expectancy of the vibration damper. Additionally, these side-to-side and circular vibrations or motions that wrap and unwrap the strands in the single-leg version of vibration dampers can tighten and loosen the strand winding for each vibration cycle. This can lead to cold working of the strands which can cause the strands to become increasingly brittle and, again, shorten the expected lifespan of the vibration damper.

In some examples, it may be beneficial if the strands 232 of the first flexible leg portion 224 were wound in a first direction or pattern while the strands of the second flexible leg portion 226 were wound in a second direction or pattern. For instance, while viewing the first flexible leg portion 224 and the second flexible leg portion 226 from the direction indicated by arrow 318, the first flexible leg portion 224 may have a clockwise lay direction of strands 232 while the second flexible leg portion 226 may have a counter-clockwise lay direction of strands 232. Flexible leg portions 224, 226 having opposing or differing lay directions or strand placement patterns may reduce the effects of wrapping, unwrapping, cold working, etc. of the strands 232 caused by vibrations or periodic motions of at least one of the cable 102 or the components of the vibration damper 104.

In some examples, the vibration damper 104 can be suspended from a cable 102 known as a "T2 conductor." T2 conductors typically consist of two standard stranded conductors twisted about one another. The aerodynamic and mechanical properties of T2 conductors help the T2 conductor to exhibit a relatively higher resistance to both galloping and aeolian vibration, however, vibration dampers are still needed on T2 conductors for optimal minimization of vibration. Many known vibration dampers exhibit relatively high fatigue when used in conjunction with T2 conductors due to autorotation (e.g., when conductors rotate about a center line of the conductor), and this rotation can be rather pronounced in T2 conductors. In other words, fatigue of the cabled or helically wound legs in many known vibration dampers can be a result of a combination of fatigue from both: movement of the weight in a generally vertical direction and movement of the weight in a circular motion. The resultant fatigue in the previously known cabled or helically wound legs can be additive over the lifetime of the device. This additive fatigue result can be relatively large in T2 wires, as rotational movement is relatively pronounced in T2 wires as previously noted. As such, the described devices and methods can be particularly well-suited to application on T2 conductor installations to reduce vibration.

Figure 4:
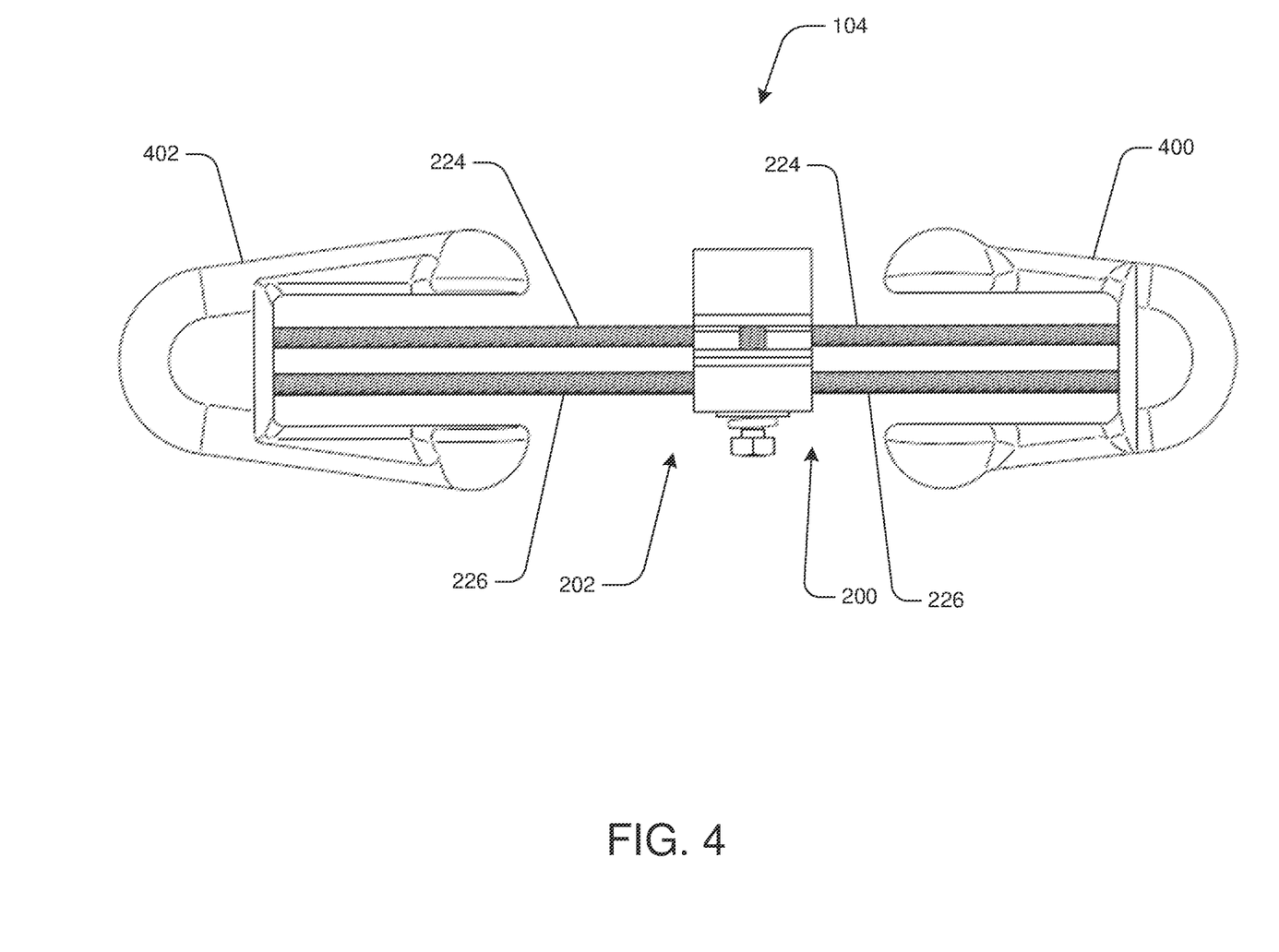
FIG. 4 is a top view of an example vibration damper taken along line 4-4 of FIG. 1.

Referring to FIG. 4, a top view of the vibration damper 104 is illustrated. In some examples, the first flexible leg portion 224 extends away from the first attachment side 200 and extends away from the second attachment side 202. Similarly, the second flexible leg portion 226 extends away from the first attachment side 200 and extends away from the second attachment side 202.

The vibration damper 104 includes a first weighted portion 400 attached to the first flexible leg portion 224 and the second flexible leg portion 226 on the first attachment side 200. The vibration damper 104 also includes a second weighted portion 402 attached to the first flexible leg portion 224 and the second flexible leg portion 226 on the second attachment side 202. In some examples, the weighted portions 400, 402 can be called damper weights. Any structure or method of attachment used to attach the first weighted portion 400 to the first flexible leg portion 224 and the second flexible leg portion 226 is satisfactory. Of course, such structure or method of attachment can be designed and manufactured to meet the expected rigors of bending stresses, vibration, expansion and contraction, weather extremes, etc. during a typical service life of a vibration damper.

The weighted portions 400, 402 can vary in size, weight and even shape depending on a particular application or desired performance. As conductors/cables increase in size, the conductors may tend to vibrate at lower frequencies. Large weighted portions provide damping at lower frequencies and small damper weights provide damping at higher frequencies. In some examples, the weighted portions are made of galvanized ductile iron casting, but can be made of any suitable material known in the art. In accordance with several aspects of the present disclosure, the weighted portions 400, 402 include a forked side which receives the first flexible leg portion 224 and the second flexible leg portion 226 as discussed with respect to FIG. 2.

Returning to FIG. 2, the first weighted portion 400 can include a first opening 228 into which the first flexible leg portion 224 is received. The first weighted portion 400 also includes a second opening 230 into which the second flexible leg portion 226 is received. Similarly, the second weighted portion 402 can include a third opening and a fourth opening that are obscured from view, but can be considered a mirror image of the openings within the first weighted portion 400. The first flexible leg portion 224 is received into the third opening while the second flexible leg portion 226 is received into the fourth opening. As previously discussed, the openings within the weighted portions 400, 402 are but an example of attachment structures and methods that can be used in conjunction with the present disclosure, and these examples are not meant to be limiting.

Returning to FIG. 3, movement of either the first weighted portion 400 or the second weighted portion 402 is restricted by the fact that the first flexible leg portion 224 and the second flexible leg portion 226 both lie within the plane 304. As such, the weighted portions 400, 402 are far more free to dampen motion up-and-down (e.g., in the first direction 312 lying within plane 310), but not in a "side-to-side" or horizontal rotating motion (e.g., in the second direction 314 lying within plane 304).

Figure 5:
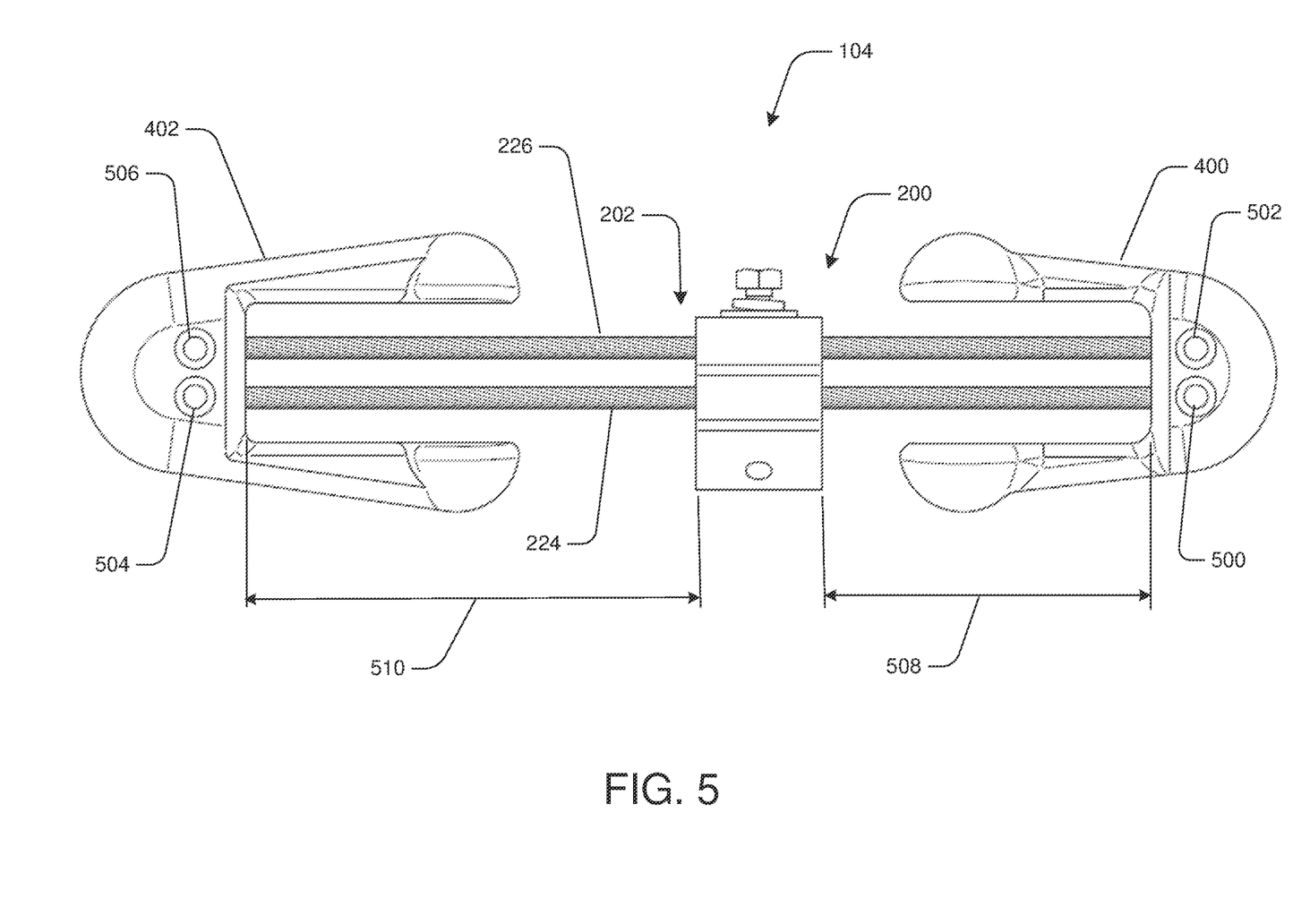
FIG. 5 is a bottom view of an example vibration damper having unequal weighted portions separated at unequal distances from an attachment side.

Referring to FIG. 5, a bottom view of the vibration damper 104 is illustrated. In some examples, the vibration damper 104 can include a first fitting 500 configured to attach the first flexible leg portion 224 to the first weighted portion 400. The vibration damper 104 can also include a second fitting 502 configured to attach the second flexible leg portion 226 to the first weighted portion 400. Similarly, the vibration damper 104 can include a third fitting 504 and a fourth fitting 506 that are configured to attach the first flexible leg portion 224 and the second flexible leg portion 226 (respectively) to the second weighted portion 402. Any suitable fitting can be used to attach the flexible leg portions 224, 226 to the weighted portions 400, 402. In some examples, the fittings 500, 502, 504, and 506 may cooperate with openings that extend from an exterior surface to the first opening 228 and to the second opening 230 in order for the fittings 500, 502, 504, and 506 to impinge upon the first flexible leg portion 224 and the second flexible leg portion 226.

It can be beneficial to attach the weighted portions 400, 402 securely to the ends of the flexible leg portions 224, 226 and this is conventionally done in any number of ways. The flexible leg portions 224, 226 can be secured within the weighted portions 400, 402 by a staking ball. Specifically, a messenger hole can be drilled (or pre-cast) in the forked side of the weighted portions 400, 402. The openings 228, 230 (shown in FIG. 2) are sized to accept any diameter of the flexible leg portions 224, 226. In some examples, the flexible leg portions 224, 226 can be between 5 mm and 10 mm in diameter, but can be any diameter for transmitting vibrations. It is worthy of note that the flexible leg portions 224, 226 may have smaller diameters than flexible leg portions (e.g., messengers) of single-leg vibration dampers because there are two flexible leg portions rather than one leg portion. Additionally, the spring rate of the leg portions 224, 226 can vary accordingly from the spring rates of flexible legs included in single-leg vibration dampers.

Figure 6:
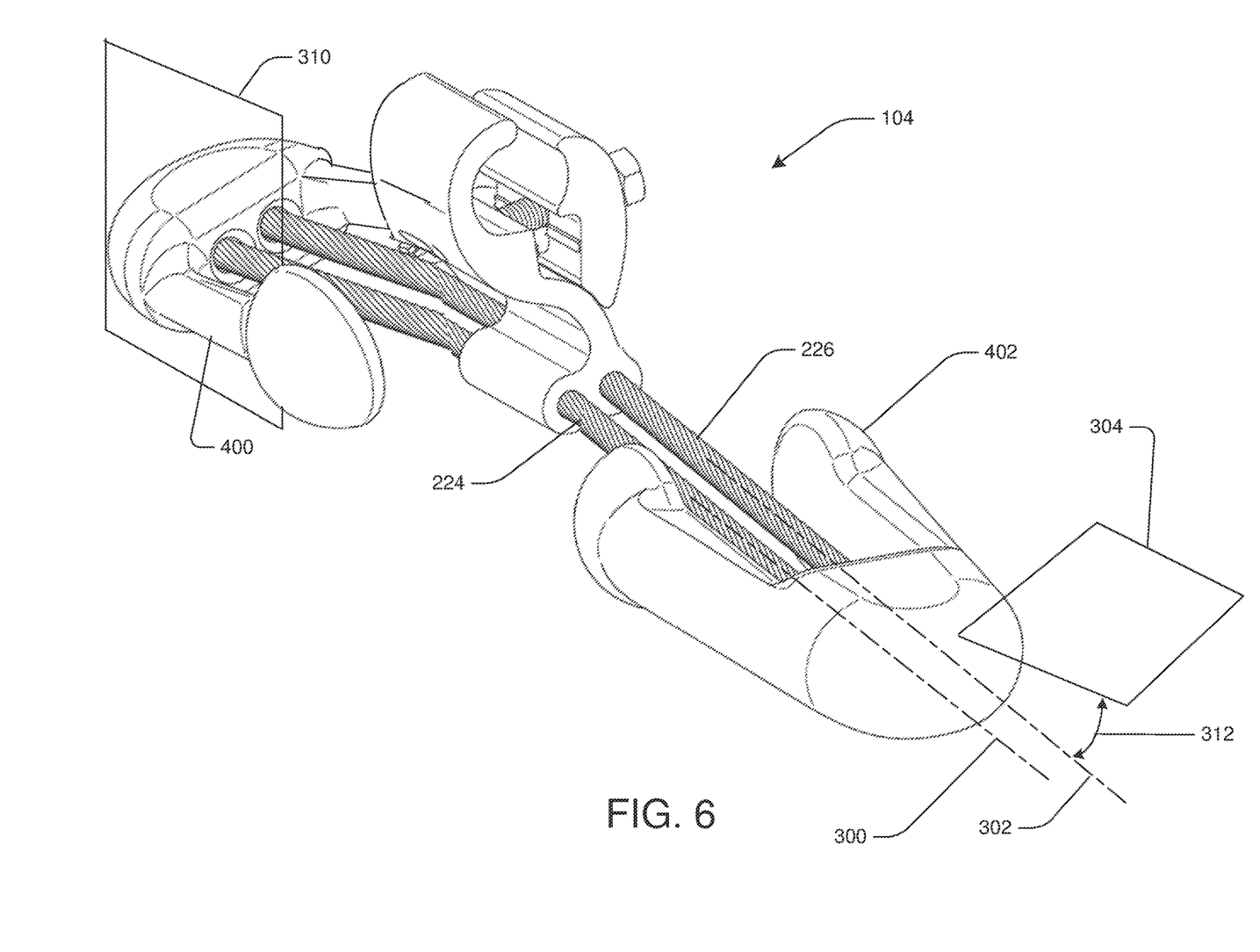
FIG. 6 is an illustration of an example vibration damper having flexed leg portions.

Referring to FIG. 6, a perspective view of the vibration damper 104 is illustrated. Each of the first flexible leg portion 224 and the second flexible leg portion 226 are shown in a deflected position such that at least a portion of the first leg axis 300 and a portion of the second leg axis 302 are not parallel to or lie within the plane 304. Instead, the first weighted portion 400 and the second weighted portion 402 are deflected by a combination of a vibration in the cable 102 (shown in FIG. 1), inertial forces of the respective weighted portion 400, 402 and the cantilevered mounting of the weighted portions 400, 402 on the relatively flexible members (e.g., the first flexible leg portion 224 and the second flexible leg portion 226). The movement or deflection of the first weighted portion 400 and the second weighted portion 402 relative to the attachment structure 106 can be represented by arrow 312 that, in some examples, is parallel to the second plane 310. In some examples, the arrow 312 representing up and down motion of the first weighted portion 400 and the second weighted portion can be within about a few degrees of lying within the second plane 310 and having a directional component that lies within the second plane 310. As discussed previously, the second plane 310 can be oriented vertically with respect to a horizontal ground surface or any other horizontal plane of reference. It is worthy of note that the range (e.g., magnitude) of deflection of the flexible leg portions 224, 226 and the weighted portions 400, 402 may be exaggerated in FIG. 6 in order to show more clearly show the direction of deflection.

While FIG. 6 does not illustrate any of the first weighted portion 400, the second weighted portion 402, the first flexible leg portion 224 or the second flexible leg portion 226 being deflected upward, or above the first plane 304, it is to be understood that these components can also be deflected upward. These upward deflections can include positions of the first weighted portion 400, the second weighted portion 402, the first flexible leg portion 224 and the second flexible leg portion 226 that effectively mirror the downward deflections shown in FIG. 6. Cyclical motion of the first weighted portion 400, the second weighted portion 402, the first flexible leg portion 224, and the second flexible leg portion 226 can cause a damping effect on the cable 102 to help reduce or attenuate vibration in the cable 102. Some examples of this cyclical motion can include motion of the first weighted portion 400, the second weighted portion 402, the first flexible leg portion 224 and the second flexible leg portion 226 from a position similar to that shown in FIG. 6 through a number of intermediate positions to an upward deflection position that mirrors the downward deflection shown in FIG. 6.

Figure 7:
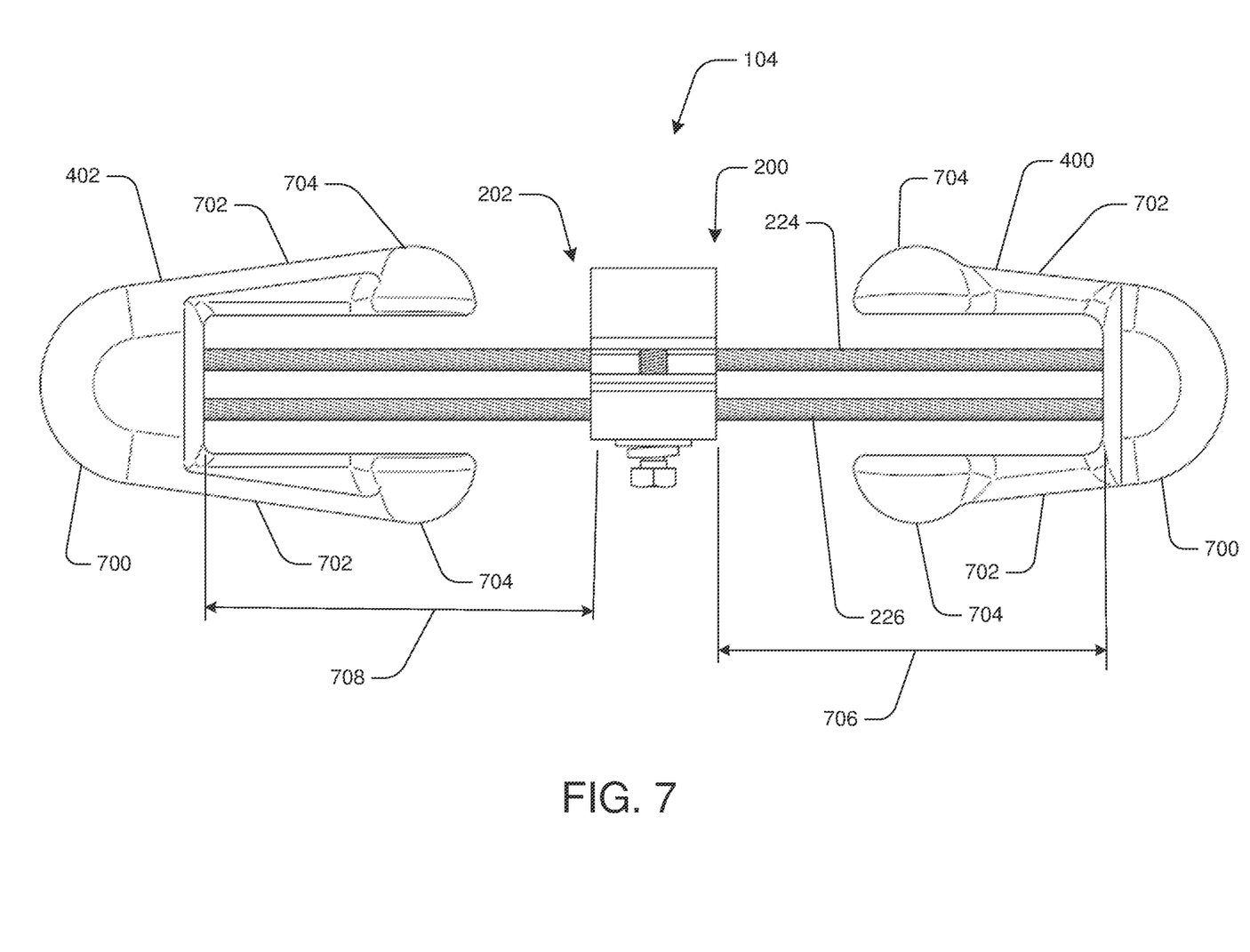
FIG. 7 is a top view of an example vibration damper with unequal weighted portions separated equal distances from the attachment side.

Referring to FIG. 7, the first weighted portion 400 and the second weighted portion 402 can include a common shape. In the shown examples, the shape can be described as a U-shape having an enlarged rounded portion 700, two legs 702 extending from the enlarged rounded portion to a hemispherical lobe 704 at an end of each of the two legs 702. In some examples, the first flexible leg portion 224 and the second flexible leg portion 226 are attached to each of the weighted portions 400, 402 at the interior portion of the U-shaped structure. It is to be appreciated that any particular shape of the first weighted portion 400 and the second weighted portion 402 can be used with the present disclosure to provide vibration damping benefits, however, the remainder of the disclosure and figures will describe the U-shaped structures.

Remaining with FIG. 7, in some examples, the first weighted portion 400 and the second weighted portion 402 are of the same general shape, but are of different sizes. Similar to the engineering and design considerations of the shape of the first weighted portion 400 and the second weighted portion 402, the sizes of the first weighted portion 400 and the second weighted portion 402 can be engineered and designed to provide particular vibration damping benefits. It is to be understood that if the shape of the first weighted portion 400 and the shape of the second weighted portion 402 are the same, and the first weighted portion 400 and the second weighted portion 402 are constructed of the same material or materials having the same density, then the different sizes of the first weighted portion 400 and the second weighted portion 402 will cause the first weighted portion 400 and the second weighted portion 402 to have different weights (and different masses). As a result, in some examples, the first weighted portion 400 has a first weight that is not equal to a second weight of the second weighted portion 402. The first weight and the second weight can be engineered to provide vibration damping benefits (e.g., promote damping of particular vibration frequencies in the cable 102).

In some examples, such as that shown in FIG. 7, the first weighted portion 400 can be spaced a first separation distance (represented by dimension 706) from the first attachment side 200. The second weighted portion 402 can be spaced a second separation distance (represented by dimension 708) from the second attachment side 202; the first separation distance 706 can be equal to the second separation distance 708. As can be appreciated, the first separation distance 706 and the second separation distance 708 can be designed and manufactured to promote damping of particular vibration frequencies in the cable 102.

Figure 8:
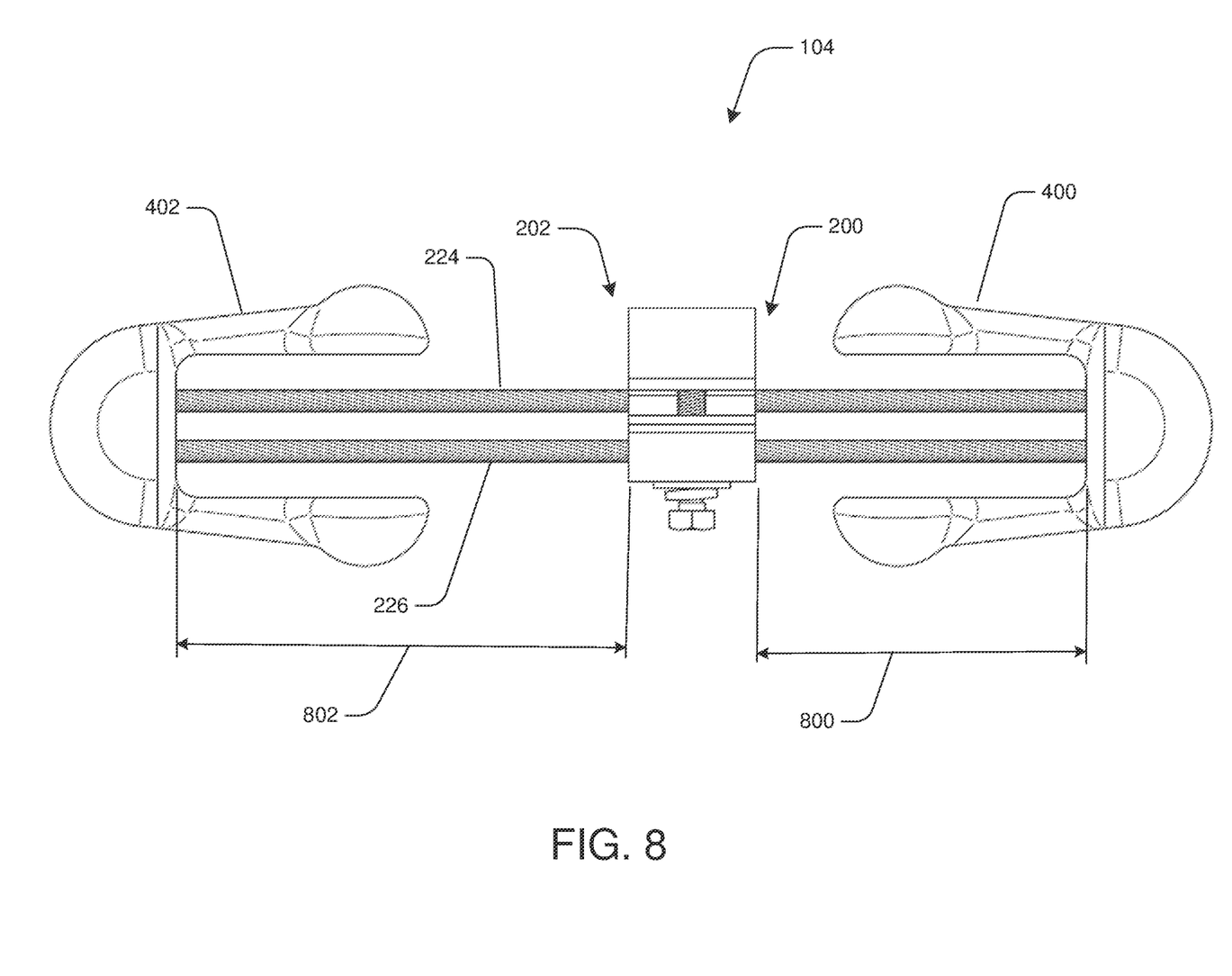
FIG. 8 is similar to FIG. 7, showing a vibration damper having equal weighted portions separated unequal distances from the attachment side.

Referring to FIG. 8, a top-down view of the vibration damper 104 is illustrated. In some examples, as shown, the first weighted portion 400 and the second weighted portion 402 have the same size and shape, and can have the same weight. However, a first separation distance 800 is not equal to a second separation distance 802. As with previously described examples, the separation distances 800, 802 can be engineered and manufactured to provide an example vibration damper 104 with particular damping properties.

Figure 9:
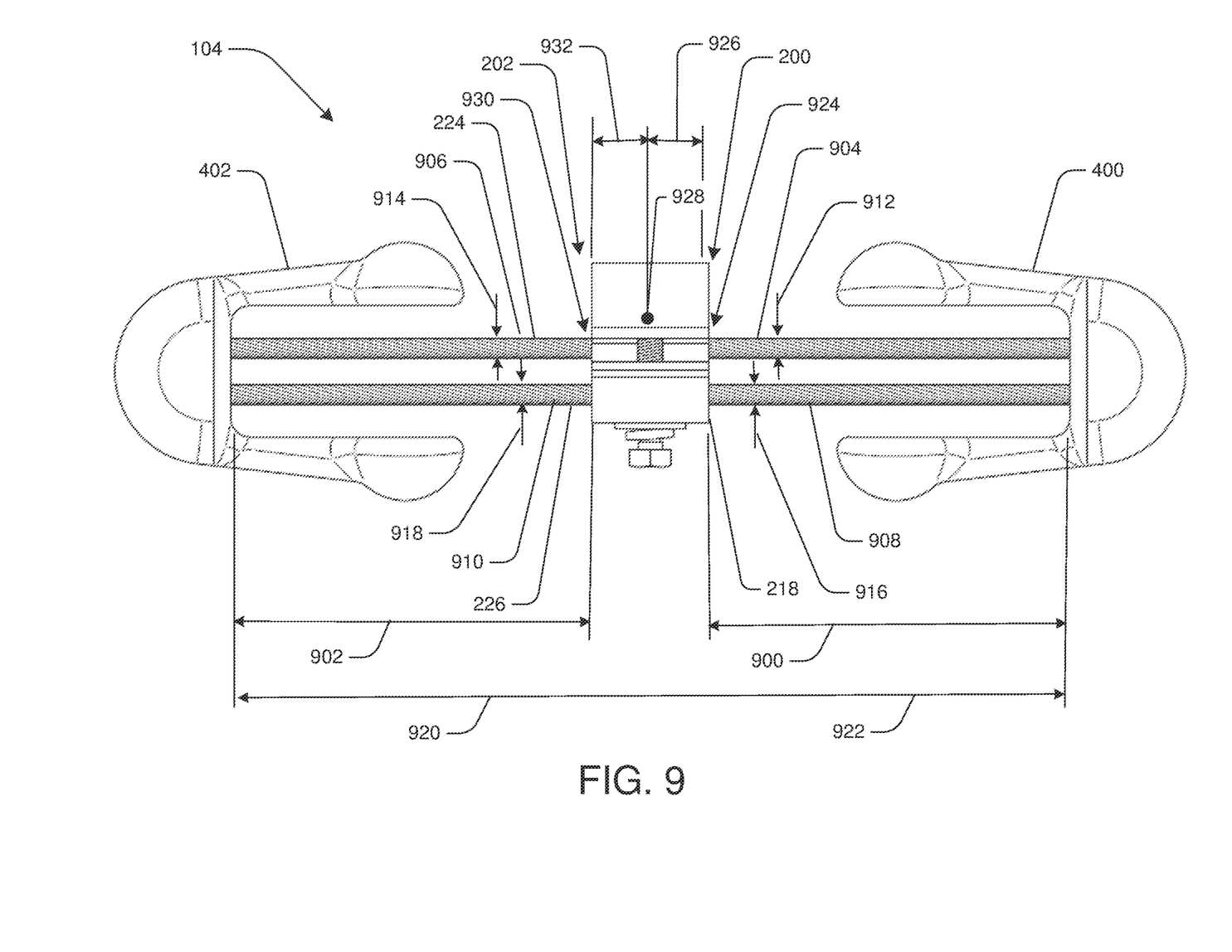
FIG. 9 is similar to FIG. 7, showing a vibration damper having equal weighted portions separated equal distances from the attachment side.

Referring to FIG. 9, a top-down view of the vibration damper 104 is illustrated to show another combination of features. In some examples, the first weighted portion 400 and the second weighted portion 402 have the same size and shape, and can have the same weight. Additionally, a first separation distance 900 can be equal to a second separation distance 902.

Returning to FIG. 5, in some examples, the first weighted portion 400 and the second weighted portion 402 do not have the same size and shape, and do not have the same weight. Additionally, in the example shown in FIG. 5, the first weighted portion 400 can be spaced a first separation distance (represented by dimension 508) from the first attachment side 200. The second weighted portion 402 can be spaced a second separation distance (represented by dimension 510) from the second attachment side 202. In some examples, the first separation distance 508 is not equal to the second separation distance 510. As shown, the first separation distance 508 can be less than the second separation distance 510.

This particular example can lend the vibration damper 104 increased design flexibility by placing the heavier weighted portion 402 on the longer side (e.g., the side with the first separation distance 510) of the vibration damper 104. The lighter weighted portion 400 is located on the shorter side (e.g., the side with the second separation distance 508). This combination enables the designer and the installer to tune the vibration damper 104 to particular frequencies thereby damping a particular range of vibration frequencies that may be affecting the cable 102 (shown in FIG. 1).

Returning to FIG. 9, the first flexible leg portion 224 can have a first section 904 and a second section 906. The second flexible leg portion 226 can have a third section 908 and a fourth section 910. As shown, the first section 904 and third section 908 extend away from the first attachment side 200 toward the first weighted portion 400. Similarly, the second section 906 and the fourth section 910 extending away from the second attachment side 202 toward the second weighted portion 402. In some examples, the first section 904 of the first flexible leg portion 224 has a first diameter (represented by dimension 912) while the second section 906 has a second diameter (represented by dimension 914). Similarly, the third section 908 of the second flexible leg portion 226 has a third diameter (represented by dimension 916) while the fourth section 910 has a fourth diameter (represented by dimension 918). In some examples, the first diameter 912 is equal to the second diameter 914. In some examples, the third diameter 916 is equal to the fourth diameter 918. In yet other examples, the first diameter 912 is not equal to the second diameter 914 and the third diameter 916 is not equal to the fourth diameter 918. In still further examples, the first diameter 912 is equal to the third diameter 916 while the second diameter 914 is equal to the fourth diameter 918. Similar to the vibration damper 104, flexible leg portions 224, 226 can be particularly designed and manufactured to provide particular vibration damping benefits (e.g., tuning the vibration damping to particular frequencies, etc.) as will be understood by a person having ordinary skill in the art.

Remaining with FIG. 9, in some examples, the first flexible leg portion 224 has a first length 920 that is equal to a second length 922 of the second flexible leg portion 226. It is to be understood that although the first length 920 and the second length 922 are shown having a dimension line (e.g., a termination point) at the location where the flexible leg portions 224, 226 meet the weighted portions 400, 402, the flexible leg portions 224, 226 can indeed extend into an internal volume of the weighted portions 400, 402 as previously described. While not shown, it is contemplated that some examples of vibration dampers may include a first flexible leg portion 224 having a different overall length than the second flexible leg portion 226.

In some examples, the first flexible leg portion 224 has a first point 924 that is a first distance (represented by dimension 926) from a mid-point 928 of the attachment portion 218. The first flexible leg portion 224 is attached to the attachment portion 218 at the first point 924. The second flexible leg portion 226 has a second point 930 that is a second distance (represented by dimension 932) from the mid-point 928 of the attachment portion 218 and the second flexible leg portion 226 is attached to the attachment portion 218 at the second point 930. The first distance 926 can be equal to the second distance 932.

Figure 10:
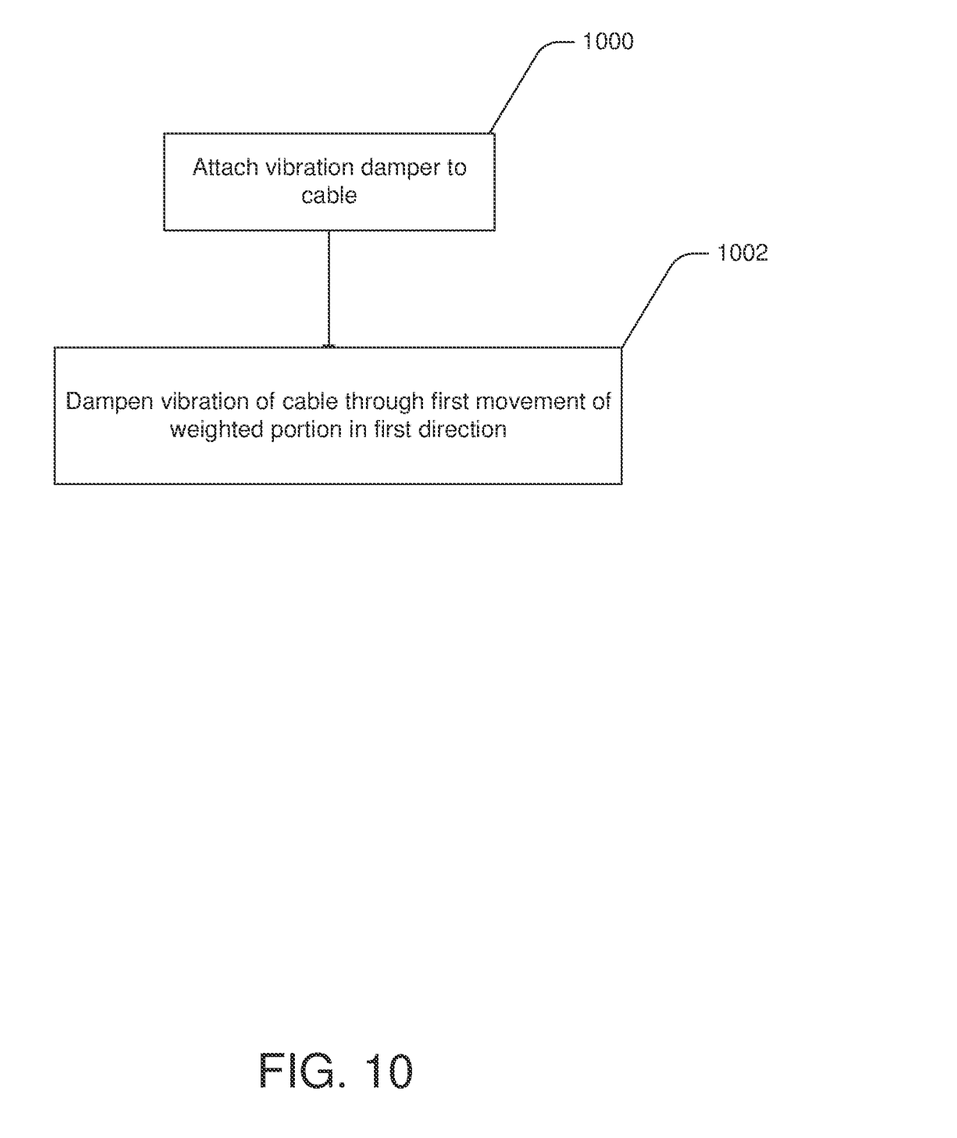
FIG. 10 is a flow chart of a method of damping a vibration of a cable.

Referring to FIG. 10, a top-down flow chart of a method of damping a vibration of a cable is illustrated. The method includes attaching a vibration damper to the cable shown at 1000. In some examples, the vibration damper includes structure previously described in this disclosure including, but not limited to, an attachment portion configured to be attached to the cable; a first flexible leg portion attached to the attachment portion and extending along a first leg axis;

and a second flexible leg portion attached to the attachment portion and extending along a second leg axis. As previously discussed, the first leg axis can be parallel to the second leg axis. The vibration damper can also include a weighted portion attached to the first flexible leg portion and the second flexible leg portion.

The method also includes damping the vibration of the cable through first movement of the weighted portion in a first direction as shown at 1002. For the purposes of this disclosure, the first direction can be perpendicular to at least one of the first leg axis or the second leg axis. The first direction can also be at least one of toward the cable or away from the cable. In some examples, the direction (e.g., the first direction) of the first movement of the weighted portion is perpendicular to a plane within which the first leg axis and the second leg axis lie. In still further examples, the method can include inhibiting a second movement of the weighted portion in a second direction parallel to the plane.

In some examples, the second direction can be perpendicular (or nearly perpendicular) to the first direction and perpendicular (or nearly perpendicular) to at least one of the first leg axis or the second leg axis (e.g., parallel to a horizontal ground surface). In some examples, inhibiting the second movement includes inducing a tension force in the first flexible leg portion (e.g., parallel to the first leg axis) and inducing a compression force in the second flexible leg portion (e.g., parallel to the second leg axis). In other words, a direction of the second movement that is inhibited can be represented by the arrow at 314 in FIG. 3, and inhibiting the second movement can induce a tension force in one of the first flexible leg portion or the second flexible leg portion. Similarly, inhibiting the second movement can induce a compression force in the other of the first flexible leg portion or the second flexible leg portion.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A vibration damper for damping a vibration of a cable, the vibration damper comprising:
    an attachment portion configured to be attached to the cable, the attachment portion including a clamp for fixed attachment to the cable;
    a first flexible leg portion attached to the attachment portion;
    a second flexible leg portion attached to the attachment portion; and
    a weighted portion attached to the first flexible leg portion and the second flexible leg portion, the weighted portion spaced a distance from the attachment portion.

2. The vibration damper of claim 1, wherein the attachment portion is crimped around the first flexible leg portion and the second flexible leg portion to attach the first flexible leg portion and the second flexible leg portion to the attachment portion.

3. The vibration damper of claim 1, wherein the weighted portion defines:
    a first opening into which the first flexible leg portion is received; and
    a second opening into which the second flexible leg portion is received.

4. The vibration damper of claim 1, comprising:
    a first fitting configured to attach the first flexible leg portion to the weighted portion; and
    a second fitting configured to attach the second flexible leg portion to the weighted portion.

5. The vibration damper of claim 1, comprising an attachment structure attached to the attachment portion configured to attach the attachment portion to the cable.

6. The vibration damper of claim 1, wherein:
    the first flexible leg portion extends along a first leg axis,
    the second flexible leg portion extends along a second leg axis, and
    the first leg axis and the second leg axis lie within a plane perpendicular to a line passing through the cable and between the first flexible leg portion and the second flexible leg portion.

7. A vibration damper for damping a vibration of a cable, the vibration damper comprising:

an attachment portion configured to be attached to the cable, the attachment portion including a clamp for fixed attachment to the cable, the attachment portion having a first attachment side and a second attachment side;

a first flexible leg portion attached to the attachment portion, the first flexible leg portion extending away from the first attachment side and extending away from the second attachment side;

a second flexible leg portion attached to the attachment portion, the second flexible leg portion extending away from the first attachment side and extending away from the second attachment side;

a first weighted portion attached to the first flexible leg portion and the second flexible leg portion, the first weighted portion spaced a first separation distance from the first attachment side; and a second weighted portion attached to the first flexible leg portion and the second flexible leg portion, the second weighted portion spaced a second separation distance from the second attachment side.

8. The vibration damper of claim 7, wherein the first separation distance is not equal to the second separation distance.

9. The vibration damper of claim 7, wherein:
the cable extends along a cable axis,
the first flexible leg portion extends along a first leg axis,
the second flexible leg portion extends along a second leg axis, and
the first leg axis and the second leg axis lie within a first plane perpendicular to a second plane extending along the cable axis.

10. The vibration damper of claim 7, wherein the first flexible leg portion has a first length that is equal to a second length of the second flexible leg portion.

11. The vibration damper of claim 7, wherein the first weighted portion has a first weight that is not equal to a second weight of the second weighted portion.

12. The vibration damper of claim 7, wherein:
the first flexible leg portion has a first section and a second section,
the second flexible leg portion has a third section and a fourth section,
the first section and third section extend away from the first attachment side toward the first weighted portion, and
the second section and the fourth section extend away from the second attachment side toward the second weighted portion.

13. The vibration damper of claim 12, wherein:
the first section has a first diameter;
the second section has a second diameter;
the third section has a third diameter;
the fourth section has a fourth diameter;
the first diameter is equal to the third diameter; and
the second diameter is equal to the fourth diameter.

14. A method of damping a vibration of a cable comprising:
attaching a vibration damper to the cable, the vibration damper comprising:
an attachment portion configured to be attached to the cable, the attachment portion including a clamp for fixed attachment to the cable;
a first flexible leg portion attached to the attachment portion and extending along a first leg axis;
a second flexible leg portion attached to the attachment portion and extending along a second leg axis; and
a weighted portion attached to the first flexible leg portion and the second flexible leg portion; and
damping the vibration of the cable through first movement of the weighted portion in a first direction:
perpendicular to at least one of the first leg axis or the second leg axis; and
at least one of toward the cable or away from the cable.

15. The method of claim 14, comprising:
inhibiting second movement of the weighted portion in a second direction perpendicular to the first direction.

16. The method of claim 15, wherein inhibiting the second movement comprises:
inducing a tension force in the first flexible leg portion and inducing a compression force in the second flexible leg portion.

17. The method of claim 14, wherein the first leg axis is parallel to the second leg axis.

18. The method of claim 14, wherein:
the first flexible leg portion has a first point that is a first distance from a mid-point of the attachment portion and the first flexible leg portion is attached to the attachment portion at the first point;
the second flexible leg portion has a second point that is a second distance from the mid-point of the attachment portion and the second flexible leg portion is attached to the attachment portion at the second point;
the first distance is equal to the second distance;
the weighted portion attached to the first flexible leg portion at the first point; and
the weighted portion attached to the second flexible leg portion at the second point.

19. The method of claim 14, wherein the first direction of the first movement of the weighted portion is perpendicular to a plane within which the first leg axis and the second leg axis lie.

20. The method of claim 19, comprising:
inhibiting second movement of the weighted portion in a second direction parallel to the plane.

* * * * *